United States Patent
Inai et al.

(10) Patent No.: US 8,048,574 B2
(45) Date of Patent: Nov. 1, 2011

(54) FUEL CELL SYSTEM AND SHUTOFF METHOD

(75) Inventors: Shigeru Inai, Wako (JP); Chihiro Wake, Wako (JP); Koichiro Miyata, Wako (JP); Ryo Jinba, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 1294 days.

(21) Appl. No.: 11/546,972

(22) Filed: Oct. 13, 2006

(65) Prior Publication Data
US 2007/0087238 A1  Apr. 19, 2007

(30) Foreign Application Priority Data
Oct. 17, 2005 (JP) ................. 2005-302241

(51) Int. Cl.
*H01M 8/04* (2006.01)
(52) U.S. Cl. ........ 429/400; 429/428; 429/429; 429/433; 429/442
(58) Field of Classification Search .................. 429/400, 429/428, 429, 433, 442
See application file for complete search history.

(56) References Cited

U.S. PATENT DOCUMENTS
2005/0221148 A1* 10/2005 Goebel ................ 429/34

FOREIGN PATENT DOCUMENTS
JP  2004-111196 A  4/2004
JP  2004-199988 A  7/2004
JP  2005-85578 A  3/2005

OTHER PUBLICATIONS
Japanese Office Action dated Mar. 24, 2009, issued in corresponding Japanese Patent Application No. 2005-302241.

* cited by examiner

*Primary Examiner* — Jane Rhee
(74) *Attorney, Agent, or Firm* — Westerman, Hattori, Daniels & Adrian, LLP (57) ABSTRACT

A fuel cell system includes a fuel cell, an operation controller, a checking unit, a scavenging unit, an instructing unit, a temperature sensor, a humidifier and a humidification controller. The operation controller selects one of a normal operation mode and a low-temperature operation mode. The checking unit determines whether the fuel cell has been started up in the low-temperature operation mode. The instructing unit provides an instruction for a shutoff of electricity generation. When the scavenging unit conducts scavenging based on the checking unit determining that the fuel cell has been started in the low-temperature operation mode in response to an instruction for a shutoff of electricity generation and an actual temperature of the fuel cell is higher than a predetermined temperature, the humidification controller controls an amount of humidification according to the actual temperature.

4 Claims, 8 Drawing Sheets

FUEL CELL SYSTEM AND SHUTOFF METHOD

BACKGROUND OF THE INVENTION

The present invention relates to a fuel cell system and a shutoff method for the system.

Development of fuel cell automobiles has prevailed in recent years, on which fuel cells such as Polymer Electrolyte Fuel Cells (PEFC) are mounted. A fuel cell automobile of this type is driven by a motor, to which electricity generated by a fuel cell is supplied.

Generally speaking, a fuel cell has a stack structure, which is made of a plurality of stacked unit cells. A unit cell has a membrane electrode assembly (MEA). When hydrogen and air containing oxygen are supplied to an anode and a cathode in the MEA, respectively, electric potential difference occurs in the unit cell. The fuel cell, which is electrically connected to an external load such as a motor, generates electricity.

The fuel cell described above produces water at the cathode while it is generating electricity. In order to maintain a moist condition for an electrolytic membrane of the MEA such that proton transportation is enhanced, it is often practiced that hydrogen and oxygen supplied during generation of electricity are humidified according to necessities.

It is feared that a fuel cell, which is possibly used in cold-temperature regions, encounters freezing if there remains water in the fuel cell. This freezing leads to blockades for gas passages in the fuel cell, which possibly cause a decrease in output electricity of the fuel cell during a subsequent startup.

A technique has been proposed that when generation of electricity by a fuel cell is shut off, water remaining in gas passages and on surfaces of MEA is forced to discharge into outside of the fuel cell by supplying a scavenging gas to the fuel cell (see patent document No. 1). In this connection, the scavenging gas represents a gas to be supplied to the fuel cell so as to forcefully discharge the water remaining in it. For example, air and nitrogen are used as scavenging gases. An operation for supplying a scavenging gas into a fuel cell so as to forcefully discharge water in the fuel cell is referred to as scavenging in this specification.

Patent document No. 1: Japanese Published Patent Application 2004-111196 (paragraphs 0019-0040 and FIG. 1).

However, although scavenging is conducted during a shutoff of the fuel cell, it sometimes occurs that water remaining on walls of the gas passages and in electrolytic membranes of the fuel cell happens to freeze eventually.

The applicants have discovered that there is a way to smoothly start up a fuel cell, which has experienced a temperature below the freezing point during its shutoff. For example, when it is feared that the fuel cell has frozen, hydrogen and air are supplied in high flow rate at a subsequent startup so that the fuel cell generates higher electricity. In this way, it is possible to rapidly warm up the fuel cell by its raised heat dissipation so as to increase its output electricity. In this specification, an operation is referred to as low-temperature startup, in which the fuel cell undergoes generation of electricity in a higher rate.

However, there has been a possible case where before it has elapsed sufficient time after the fuel cell is started in a low-temperature startup, an ignition (IG) is turned off and scavenging is conducted as usual at shutoff while the fuel cell keeps a high temperature. In this case, electrolytic membranes and the like are possibly dehydrated too much, which results in a possible decrease in output electricity of the fuel cell during its subsequent startup. There has also been a case where before it has elapsed sufficient time after the fuel cell is started in a low-temperature startup, IG is turned off while the fuel cell keeps a low temperature. Because water vapor (water), which is produced before turning off IG as a by-product in parallel with electricity generation, happens to condense in the fuel cell, the resulting condensed water possibly causes a decrease in output electricity of the fuel cell during its subsequent startup.

SUMMARY OF THE INVENTION

In view of the drawbacks described above, the present invention seeks to provide a fuel cell system which facilitates proper shutoff operation and its shutoff method.

It is an aspect of the present invention to provide a fuel cell system including a fuel cell, an operation controller, a checking unit, a scavenging unit, an instructing unit, a temperature sensor, a humidifier and a humidification controller. The fuel cell has a reactive gas passage and generates electricity with a reactive gas supplied to the reactive gas passage. The operation controller is configured to control operation of the fuel cell at startup by selecting one of a normal operation mode and a low-temperature operation mode to expedite a startup of the fuel cell. The checking unit is configured to determine whether or not the fuel cell has been started up in the low-temperature operation mode. The scavenging unit is configured to supply a scavenging gas to the reactive gas passage to scavenge it. The instructing unit is configured to provide an instruction for a shutoff of electricity generation of the fuel cell. When the instructing unit transmits the instruction, the scavenging unit scavenges the reactive gas passage. The temperature sensor detects a temperature of the fuel cell. The humidifier humidifies the scavenging gas to be supplied to the fuel cell. The humidification controller is configured to control an amount of humidification provided by the humidifier. When the scavenging unit conducts scavenging based on the checking unit determining that the fuel cell has been started in the low-temperature operation mode in response to an instruction for a shutoff of electricity generation and an actual temperature of the fuel cell detected by the temperature sensor is higher than a predetermined temperature, the humidification controller controls an amount of humidification according to the actual temperature of the fuel cell.

The fuel cell system described above, in which the humidifier controls the amount of humidification according to the actual temperature of the fuel cell when the temperature of the fuel cell is higher than the predetermined temperature, is able to shut off the fuel cell system with prevention of excessive dehydration of electrolytic membranes and the like. As a result, the fuel cell system is able to provide proper generation of electricity at a subsequent startup It is another aspect of the present invention to provide a fuel cell system, in which electricity generation of the fuel cell is continued until completion of scavenging conducted by the scavenging unit.

The fuel cell system described above produces water at its cathodes by continuing generation of electricity. This water is partly supplied to the electrolytic membranes so as to keep them properly moistened.

It is still another aspect of the present invention to provide a fuel cell system, in which the predetermined temperature is defined as a temperature of the fuel cell. The temperature is based on an amount of discharged water dependent on the temperature of the fuel cell and an amount of water which can be contained in the fuel cell during a shutoff of electricity generation. The discharged water is discharged from the fuel cell by scavenging conducted after an instruction for the shutoff is generated.

Because the predetermined temperature is set in such a manner in the fuel cell system described above, it is possible to keep the electrolytic membranes properly moistened.

It is yet another aspect of the present invention to provide a fuel cell system, which includes a fuel cell, an operation controller, a checking unit, a scavenging unit, an instructing unit, a temperature sensor, a humidifier, a humidification controller. The fuel cell has a reactive gas passage and generates electricity with a reactive gas supplied to the reactive gas passage. The operation controller is configured to control operation of the fuel cell at startup by selecting one of a normal operation mode and a low-temperature operation mode to expedite a startup of the fuel cell. The checking unit is configured to determine whether or not the fuel cell has been started up in the low-temperature operation mode. The scavenging unit is configured to supply a scavenging gas to the reactive gas passage to scavenge it. The instructing unit is configured to provide an instruction for a shutoff of electricity generation of the fuel cell. When the instructing unit transmits the instruction, the scavenging unit scavenges the reactive gas passage. The temperature sensor detects a temperature of the fuel cell. The humidifier humidifies the scavenging gas to be supplied to the fuel cell. The humidification controller is configured to control an amount of humidification provided by the humidifier. When the scavenging unit conducts scavenging based on the checking unit determining that the fuel cell has been started in the low-temperature operation mode in response to an instruction for a shutoff of electricity generation and an actual temperature of the fuel cell detected by the temperature sensor is not higher than a predetermined temperature, the humidification controller controls the humidifier so as not to conduct humidification.

The actual temperature of the fuel cell is not higher than the predetermined temperature when the instruction for shutoff of electricity generation is transmitted after the fuel cell is started in the low-temperature operation mode. Accordingly, the water vapor (water), which is produced as a by-product during the electricity generation carried out before the shutoff, tends to condense in the reactive gas passage. Due to the resulting condensed water, it is difficult for water in the MEA to migrate into the reactive gas passage. The fuel cell system described above, in which the humidifier controller controls the humidifier so as not to humidify the scavenging gas, is able to supply the dry scavenging gas without humidification. Because the condensed water tends to evaporate to be absorbed into the dry scavenging gas, it is possible to efficiently discharge the condensed water and then to shutoff the fuel cell system. As a result, the fuel cell can provide proper generation of electricity at a subsequent startup.

DETAILED DESCRIPTION OF THE INVENTION

An embodiment of the present invention is now described with reference to FIGS. 1 to 6.

1. Architecture of Fuel Cell System

Figure 1:
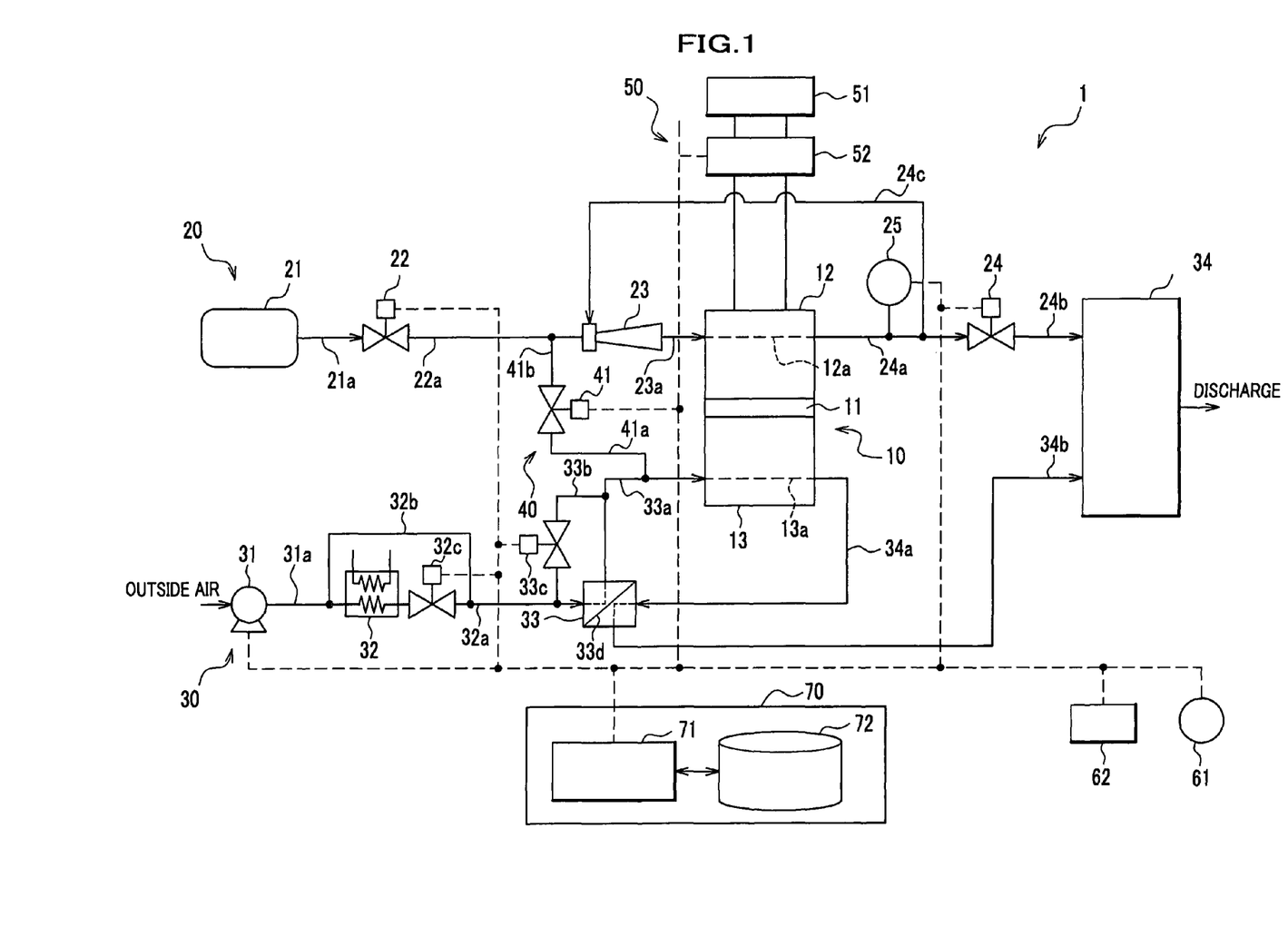
FIG. 1 is a schematic diagram showing architecture of a fuel cell system according to the present invention.

As shown in FIG. 1, a fuel cell system 1 is mounted on a fuel cell automobile. The fuel cell system 1 has a traction motor 51, which is electrically connected with output terminals (not shown) of a fuel cell 10. The fuel cell automobile is driven by the traction motor 51, which is energized by electricity generated by the fuel cell 10.

The fuel cell system 1 includes a fuel cell 10, an anode system 20, a cathode system 30, a scavenging system 40, a power consumption system 50, an ambient temperature sensor 61, an electronic control unit (ECU) 70 and the like. The anode system 20 supplies hydrogen (fuel gas, reactive gas) to the fuel cell 10 and discharges it from the fuel cell 10. The cathode system 30 supplies air containing oxygen (oxidant gas, reactive gas) to the fuel cell 10 and discharges it from the fuel cell 10. The scavenging system 40 introduces a scavenging gas from a compressor 31 to the anode system 20. The power consumption system 50 consumes electricity generated by the fuel cell 10. ECU 70 electronically controls these components.

a. Fuel Cell

Te fuel cell (fuel cell stack) 10 is a polymer electrolyte fuel cell which is made of a plurality of stacked unit cells. A unit cell includes a membrane electrode assembly (MEA) and a pair of separators interposing the MEA. In the MEA, there are an anode (fuel electrode) 12 and a cathode (air electrode) 13 which sandwich both surfaces of an electrolytic membrane (solid polymer membrane) 11. In each separator, grooves and through holes are formed, which serve as an anode passage 12a and a cathode passage 13a. Hydrogen or oxygen is supplied through grooves throughout a plane of the MEA. The hydrogen and oxygen are introduced for all unit cells through the through holes. In other words, the hydrogen flows through the anode passage 12a so that the hydrogen is supplied to each anode 12. On the other hand, the air containing oxygen flows through the cathode passage 13a so that the air is supplied to each cathode 13.

When the hydrogen is supplied to the anode 12 and the air containing oxygen is supplied to the cathode 13 of the fuel cell 10, respectively, an electrochemical reaction occurs on a catalyst (platinum and the like) of each of the anode 12 and the cathode 13, which results in an electric potential difference in each unit cell. When there is an instruction for the fuel cell 10 requesting for generation of electricity from external loads such as the traction motor 51, ECU 70 controls a voltage control unit (VCU) 52 such that the fuel cell starts generating electricity.

b. Anode System

The anode system 20 includes a hydrogen tank 21, a shut-off valve (shut-off means) 22, an ejector 23, a purge valve (purge means) 24, a temperature sensor (temperature detecting means) 25 and the like.

The hydrogen tank 21 is connected via a line 21a with the shut-off valve 22, which is connected with the ejector 23 via a line 22a. The ejector 23 is connected with the anode passage 12a via a line 23a. A pressure reducing valve (not shown) is disposed in the line 22a. When a controller 71 of ECU 70 opens the shut-off valve 22, the hydrogen is depressurized by the pressure reducing valve and then supplied to the anode passage 12a.

In downstream of the anode passage 12a, a line 24a, the purge valve 24 whose open-close status is controlled by the controller 71, a line 24b and a dilutor 34 are connected with sequentially each other. A line 24c (circulating means), which is connected with a middle of the line 24a, provides fluid communication between the line 24a and the ejector 23. When the controller 71 closes the purge valve 24, an anode exhaust gas containing water and unreacted hydrogen, which is discharged from the anode passage 12a, is returned to the ejector 23. In this way, the hydrogen circulates. In contrast, when the purge valve 24 is opened, the anode exhaust gas is sent to the diluter 34. It should be noted that opening and closing of the purge valve 24 is conducted in order to discharge impurities such as water, which move along with the circulated hydrogen, at regular intervals or when an output voltage (cell voltage) of a unit cell of the fuel cell (stack) 10 has dropped. The purge valve 24 is configured to open during scavenging of the fuel cell 10. The temperature sensor 25, which is disposed in the line 24a, detects a temperature of the line 24a, which is considered representative of an actual temperature of the fuel cell 10 (FC temperature) or a system temperature of the fuel cell system 1. The temperature sensor 25 is electrically connected with the controller 71 so as to watch the temperature of the fuel cell 10 or the system temperature.

c. Cathode System

The cathode system 30 includes a compressor 31 (supercharger, oxidant gas supplying means), an intercooler 32 (heat exchanger), a humidifier 33 (humidifying means), a diluter 34 and the like.

Description is first given of a portion of the cathode system 30 lying in upstream of the fuel cell 10.

The compressor 31 introduces the ambient air, which is compressed and sent to the cathode 13 of the fuel cell 10 as an oxidant gas (scavenging gas while scavenging is conducted). The compressor 31 is connected with the intercooler 32 via a line 31a. The compressor 31 is electrically connected with the controller 71, so that the controller 71 controls the compressor 31.

The intercooler 32 is a heat exchanger, which cools high-temperature air heated by compression carried out by the compressor 31. For example, air supplied by the compressor 31 is cooled by air-cooling. The intercooler 32 is connected with the humidifier 33 via a line 32, so that the cooled air is supplied to the humidifier 33.

A line 32b is provided, which bypasses the intercooler 32. When an intercooler valve 32c is closed, which is disposed in immediate downstream of the intercooler 32, air supplied by the compressor 31 bypasses the intercooler 32. And when an intercooler valve 32c is opened, air is supplied to the intercooler 32. Because the line via intercooler 32 is larger than the line 32b. It should be noted that opening of the intercooler valve 32c is not only adjustable but also properly controllable by the controller 71, with which the intercooler valve 32c is electrically connected.

The humidifier 33 humidifies air (a scavenging gas during scavenging) to be supplied to the fuel cell 10. The humidifier 33 has a built-in hollow fiber membrane 33d which provides water exchange between the air supplied by the compressor 31 (intercooler 32) and a moist cathode exhaust gas, which contains product water discharged from the cathode passage 13a. The humidifier 33 is connected with the cathode passage 13a via a line 33a so that humidified air is supplied to the cathode passage 13a.

A line 33b is provided so that the air supplied by the compressor 31 (intercooler 32) bypasses the humidifier 33. When a humidifier valve 33c (humidification adjusting means) is opened, which is disposed in the line 33b, the air supplied by the compressor 31 (intercooler 32) bypasses the humidifier 33.

It should be noted that opening of the humidifier valve 33c is adjustable so that an amount of gas bypassing the humidifier 33, which is also referred to as an amount of bypassing, can be determined for all amount of gas supplied by the compressor 31 (intercooler 32). More specifically speaking, if the humidifier valve 33c is completely opened to provide an amount of bypassing about 100%, it means that all the gas substantially bypasses the humidifier 33 (see FIG. 2), in which case a dry scavenging gas without humidification is supplied to the fuel cell 10. The humidifier valve 33c is electrically connected with the controller 71, so that the humidifier valve 33c is properly controlled by the controller 71.

Description is given of a portion of the cathode system 30 lying in downstream of the fuel cell 10.

A downstream side of the cathode passage 13a is connected with the humidifier 33 via a line 34a, so that a moist cathode exhaust gas containing product water is supplied to the humidifier 33. The cathode exhaust gas, which has undergone water exchange in the humidifier 33 to contain less amount of water, is supplied to the diluter 34 via a line 34b.

The diluter 34 dilutes hydrogen contained in the anode exhaust gas coming from the anode system 20 and has a space for dilution inside. The anode exhaust gas containing hydrogen coming from the anode system 20 and the cathode exhaust gas (gas for diluting) coming from the humidifier 33 are introduced into this space. The hydrogen in the anode exhaust gas is diluted by the cathode exhaust gas. When the hydrogen is turned to a diluted gas having hydrogen concentration not more than a predetermined value, it is discharged into the atmosphere.

d. Scavenging System

The scavenging system 40 has a scavenging valve 41, which is selectively opened and closed by the controller 71. The line 33a of the cathode system 30 and the line 22a of the anode system 20 are connected with each other via a line 41a, the scavenging valve 41 and a line 41b. In this way, when the scavenging valve 41 is opened during scavenging of the fuel cell 10, a scavenging gas is introduced from the cathode system 30 to the anode system 20.

It should be noted that in this embodiment the scavenging unit in the appended claims includes the compressor 31 and the scavenging system 40.

e. Power Consumption System

The power consumption system 50, which is electrically connected with output terminals (not shown) of the fuel cell 10, consumes electricity generated by the fuel cell 10. The power consumption system 50 includes a traction motor 51 (external load), a voltage control unit (VCU) 52 and the like. In addition, a motor of the compressor 31 is also included in the power consumption system 50.

The traction motor 51 is electrically connected with the output terminals of the fuel cell 10 via VCU 52. VCU 52 is a current and voltage controller which controls output current and voltage of the fuel cell 10. In other words, VCU 52 extracts current properly so that the fuel cell 10 generates electricity. VCU 52 includes a contactor (relay), a DC-DC converter and the like, for example. VCU 52 is electrically connected with the controller 71, so that the controller 71 flexibly controls the output current and voltage. If the controller 71 sets an output current of zero amperes, for example, the fuel cell 10 will not generate electricity.

f. Ambient Temperature Sensor

The ambient temperature sensor 61 detects an ambient temperature and is disposed in a proper location (body, for example) of a fuel cell automobile. The ambient temperature sensor 61 is electrically connected with the controller 71, which watches an ambient temperature.

g. Ignition (IG)

An ignition (IG) 62 is a switch for starting a fuel cell automobile (fuel cell system 1) handled by a driver and disposed in the proximity of a driver's seat. IG 62 is electrically connected with the controller 71, which starts control receiving ON and OFF signals of IG 62.

In this embodiment, IG 62 corresponds to the instructing unit and an OFF signal, which is generated to send for the controller 71 when IG 62 is turned off, corresponds to the instruction for a shutoff of electricity generation in the appended claims.

h. ECU

ECU 70, which electronically controls the fuel cell system 1, includes CPU, ROM, RAM, various types of interfaces, electronic circuits and the like. ECU 70 has a controller 71 (operation controller, checking unit) and a control data memory 72 (means for storing control data).

i. Controller

The controller 71 is electrically connected with the shut-off valve 22 and purge valve 24 of the anode system 20, the compressor 31, the intercooler valve 32c and the humidifier valve 33c of the cathode system 30, the scavenging valve 41 of the scavenging system 40 and VCU 52 of the power consumption system 50. The controller 71 controls these components.

A further description is given of the relationship between the controller 71 and the compressor 31.

The controller 71 has "a normal operation mode" and "a low-temperature operation mode". The normal operation mode means that the fuel cell system 1 is normally operated. The low-temperature operation mode means that self heat dissipation of the fuel cell 10 is increased so as to expedite warming-up of the fuel cell system 1. The controller 71 selectively applies these modes so as to control the compressor 31.

A more detailed description is given of the modes described above. The normal operation mode according to this embodiment represents a mode in which the compressor 31 is operated at a normal rotational speed (a rotational speed which is established in advance as a speed at startup, for example). In this way, air (reactive gas for normal operation) is supplied to the fuel cell 10 at a normal flow rate and a normal pressure so that the fuel cell 10 normally generates electricity. In contrast, the low-temperature operation mode represents a mode in which the compressor 31 is operated at a higher rotational speed than the normal operation mode. In this way, air (reactive gas for low temperature operation) is supplied to the fuel cell 10 at a higher flow rate and a higher pressure than the normal operation mode so that the fuel cell 10 generates more electricity.

That is, the fuel cell 10 dissipates more heat in the low-temperature operation mode than in the normal operation mode. The controller 71 selectively applies the normal operation mode and the low-temperature operation mode to the fuel cell 10 so as to control heat dissipated by the fuel cell 10.

Therefore, if the controller 71 (operation controller) selects a low-temperature operation mode at startup to start the fuel cell 10, it is possible to rapidly warm up the fuel cell 10 and the fuel cell system 1 so as to expedite their startup. In this connection, starting the fuel cell 10 in a low-temperature operation mode is referred to as low-temperature startup.

The controller 71 has a FlagA which indicates whether or not a low-temperature startup is carried out according to whether or not the fuel cell 10 has experienced a temperature below the freezing point. FlagA=0 means that the fuel cell 10 has not experienced a temperature below the freezing point and a low-temperature startup is not carried out. FlagA=1 means that the fuel cell 10 has experienced a temperature below the freezing point and a low-temperature startup is carried out. The controller 71 selectively sets a flag (FlagA←1) and resets a flag (FlagA←0). When the controller 71 (checking unit) conducts control at shutoff, it determines whether or not a low-temperature startup has been carried out in a previous startup based on FlagA (see S103 of FIG. 3).

The controller 71 is electrically connected with the temperature sensor 25 and the ambient temperature sensor 61 so as to watch temperatures. The controller 71 is also connected with IG 62 (instructing unit) so as to detect an ON signal or an OFF signal (instruction for a shutoff of electricity generation) of IG 62.

j. Control Data Memory

Figure 3:
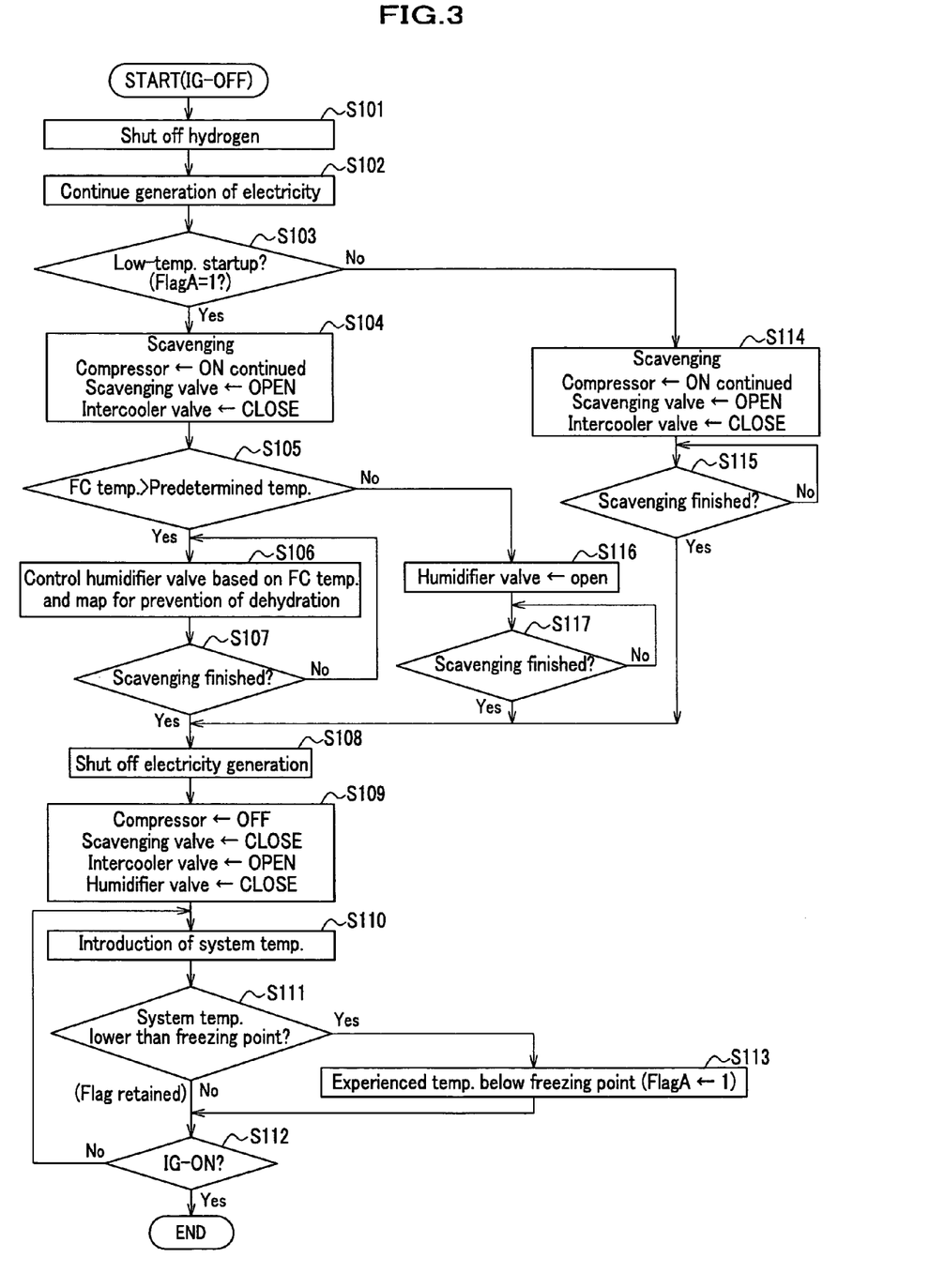
FIG. 3 is a flow chart showing steps for shutting off the fuel cell system according to the present invention.

The control data memory 72 stores a predetermined temperature which is used as a criterion to determine whether or not a scavenging gas is humidified during scavenging at shutoff subsequent to a low-temperature startup (see S105 of FIG. 3).

The predetermined temperature is defined as a temperature of the fuel cell 10 which appears at an intersection of lines representing an amount of discharged water and an allowable amount of water at shutoff, respectively. It is assumed in FIG. 5A that an amount of scavenging gas is constant (a rotational speed of the compressor 31 is constant) irrespective of a temperature of the fuel cell 10. In addition, the amount of discharged water, the allowable amount of water and the predetermined temperature at shutoff are determined in advance by testing and the like.

The amount of discharged water represents an amount of water discharged by the fuel cell 10 during scavenging at a shutoff of the fuel cell system 1. This amount of discharged water is dependent on a temperature of the fuel cell 10. More specifically speaking, the higher is the temperature of the fuel cell 10, the more tends to be the amount of water discharged from the fuel cell 10. The reason for this is that the higher is the temperature of the fuel cell 10, the higher is the temperature of scavenging gas, which increases saturated vapor in the scavenging gas.

The allowable amount of water represents not only an amount of water, which is allowed to remain in the fuel cell 10 while not in operation, but also a maximum amount of water which does not decrease performance of the fuel cell 10 in terms of electricity generation at a subsequent startup. In this connection, this allowable amount of water, which includes water contained in the electrolytic membrane 11 and the like, has a constant value independent of the temperature of the fuel cell 10.

When a temperature of the fuel cell 10 is higher than the predetermined temperature during scavenging at shutoff, conventional scavenging dehydrates the electrolytic membrane excessively, which adversely affects restartup performance in a subsequent operation. Scavenging according to this embodiment, in which the scavenging gas is humidified as discussed later when the temperature of the fuel cell 10 is higher than the predetermined temperature, does not dehydrate the electrolytic membrane 11 excessively, so that an amount of water in the fuel cell 10 after scavenging is adjusted to the allowable amount of water.

The control data memory 72 stores a map (see FIG. 2), which is referred to when the electrolytic membrane 11 is prevented from being dehydrated by humidification of the scavenging gas. This map is obtained in advance by testing, for example.

Figure 2:
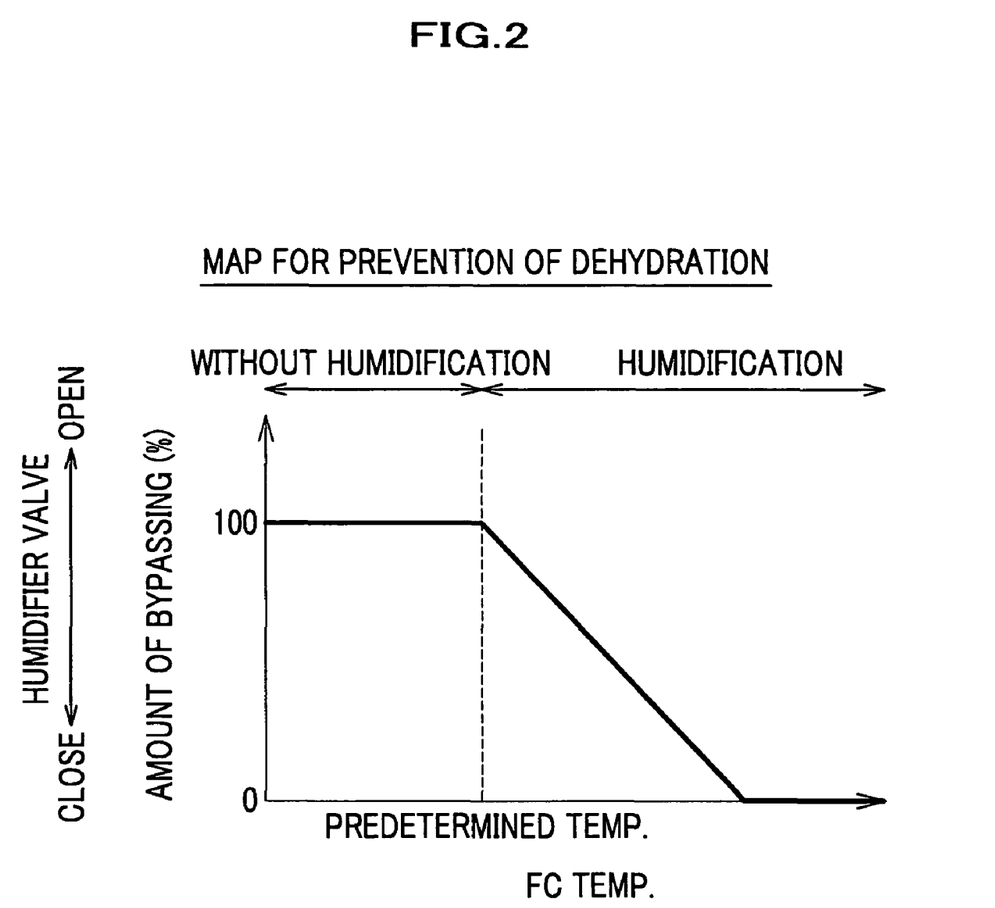
FIG. 2 is a map for prevention of dehydration according to the present invention.

As shown in FIG. 2, the map for prevention of dehydration reads 100% of an amount of scavenging gas bypassing the humidifier 33 (the humidifier valve 33*c* is fully opened), when a temperature of the fuel cell 10 is not more than the predetermined temperature. In this way, the scavenging gas is not humidified and a dry scavenging gas is supplied to the fuel cell 10. In contrast, when the temperature of the fuel cell 10 is more than the predetermined temperature, opening of the humidifier valve 33*c* decreases progressively and an amount of bypassed scavenging gas linearly decreases, accordingly. When the humidifier valve 33*c* is fully closed, this amount reaches 0%. In this connection, when the amount of bypassed scavenging gas is equal to 0%, the whole scavenging gas supplied by the compressor 31 (intercooler 32) is sent to the humidifier 33.

The control data memory 72 also stores a predetermined time, by which whether or not scavenging is terminated is determined when the controller 71 controls the fuel cell system 1 at shutoff. This predetermined time is related to volume of the anode passage 12*a* and the cathode passage 13*a* and an amount of scavenging gas during scavenging (rotational speed of the compressor 31). The predetermined time is obtained in advance by testing and the like.

The control data memory 72 further stores the freezing point (see S111 of FIG. 3), by which it is determined whether or not a temperature below the freezing point has been experienced during shutoff.

2. Operation of Fuel Cell System

Figure 4:
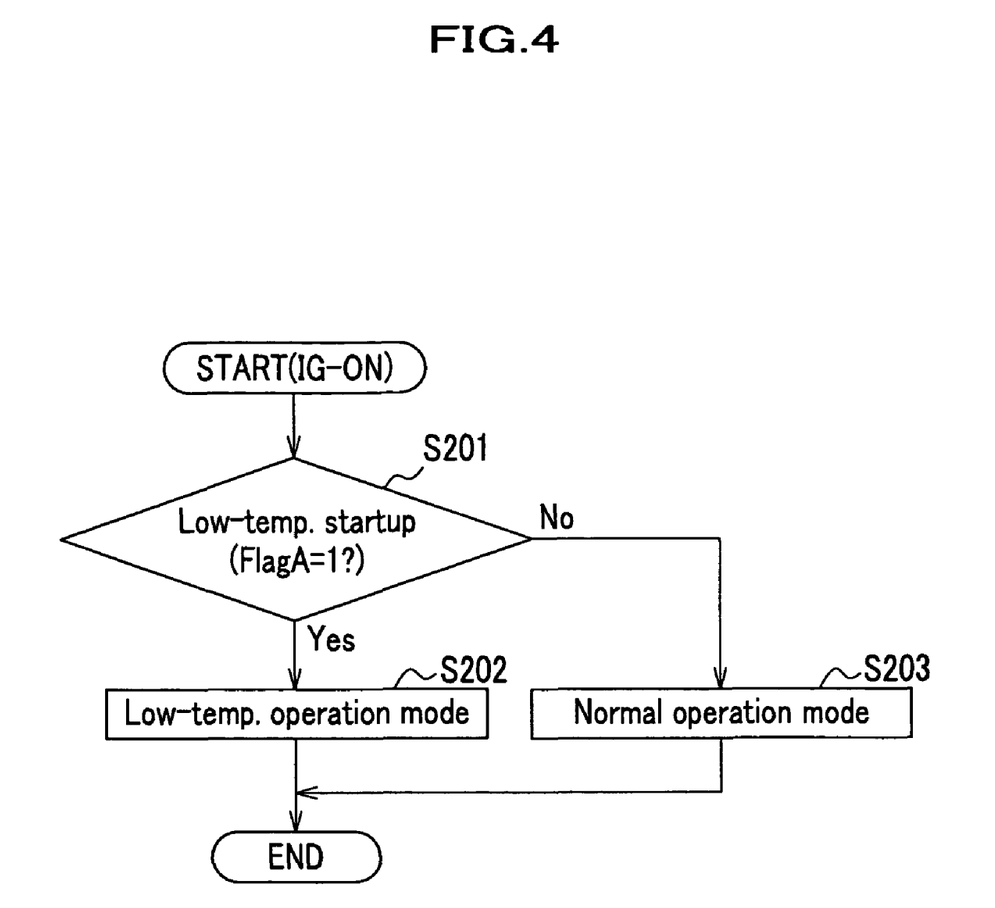
FIG. 4 is a flow chart showing steps for starting up the fuel cell system according to the present invention.

Description is given of operation of the fuel cell system 1 with reference to FIGS. 3 and 4.

a. Shutoff of Fuel Cell System

First, description is given of a method for shutting off the fuel cell system 1 in conjunction with operation of the fuel cell system 1 at shutoff. The method for shutting off the fuel cell system 1 according to this embodiment has the following features. When the fuel cell system 1 has experienced a low-temperature startup, scavenging is carried out for the anode passage 12*a* and the cathode passage 13*a*. In addition, if a temperature of the fuel cell 10 is higher than a predetermined temperature, an amount of humidification for the scavenging gas is adjusted according to an actual temperature of the fuel cell 10. On the other hand, if the temperature of the fuel cell 10 is not higher than the predetermined temperature, scavenging is carried out with a dry scavenging gas without humidification.

An exemplary case is described here in which a driver turns off IG 62 (instructing unit) and an OFF signal (instruction for a shutoff of electricity generation) triggers a start of a control flow at shutoff as shown in FIG. 3.

In step S101 the controller 71 closes the shut-off valve 22 to shut off supply of hydrogen to the fuel cell 10.

The controller 71 controls VCU 52 so that the fuel cell 10 continues to generate electricity with remaining hydrogen and oxygen contained in air, which is continuously supplied to the fuel cell 10 (step S102). It is preferable, but not necessarily, that the electricity obtained by the continued generation is used for energizing the compressor 31. In addition, it may be possible, but not necessarily, that circulation of cooling fluid (radiator fluid) for preventing excessive temperature rise of the fuel cell 10 is stopped.

In step S103, the controller 71 determines whether or not a low-temperature startup has been carried out at a previous startup of the fuel cell 10 prior to a current turning-off of IG 62. More specifically speaking, the controller 71 uses FlagA indicative of presence of a low-temperature startup. If FlagA is equal to 1, the controller 71 determines that a low-temperature startup has been conducted (S103 Yes). Flow proceeds to step S104. The controller 71 substitutes 0 for FlagA to reset it. In contrast, if FlagA is equal to 0, the controller 71 determines that a low-temperature startup has not been conducted and flow proceeds to step S114.

In step S104, the controller 71 controls so as to scavenge the anode passage 12*a* and the cathode passage 13*a* of the fuel cell 10.

The controller 71 increases a rotational speed of the compressor 31 appropriate for scavenging. The controller 71 opens the purge valve 24 and the scavenging valve 41 so as to supply a scavenging gas to the anode passage 12*a* and the cathode passage 13*a* at a high flow rate. In this way, scavenging is conducted for the anode passage 12*a* and the cathode passage 13*a*. While this scavenging is being conducted, the controller 71 closes the intercooler valve 32*c* so that the scavenging gas bypasses the intercooler 32. In this way, an uncooled scavenging gas having an ambient temperature is supplied to the anode passage 12*a* and the cathode passage 13*a*, so that it is easier to scavenge the anode passage 12*a* and the like. As described later, when the controller 71 opens the humidifier valve 33*c* so as to humidify the scavenging gas, it may be that proper humidification is more easily conducted for the scavenging gas if it is not cooled.

It should be noted that while scavenging the anode passage 12*a* and the cathode passage 13*a*, the controller 71 controls VCU 52 so that the fuel cell 10 continues to generate electricity with the remaining hydrogen and the oxygen contained in the scavenging gas. While the generation of electricity is continued this way, water is produced in the cathode 13. A part of the product water permeates the electrolytic membrane 11, so that its moisture is kept. In other words, the part of the product water resulting from the generation of electricity prevents the electrolytic membrane 11 from being dehydrated excessively. As a result, it is possible to start up the fuel cell 10 smoothly at a subsequent startup.

In step S105, the controller 71 determines whether or not an actual temperature of the fuel cell 10 detected by the temperature sensor 25 is higher than the predetermined temperature stored in the control data memory 72.

When the controller 71 determines that the temperature of the fuel cell 10 is higher than the predetermined temperature (S105 Yes), flow proceeds to step S106. It should be noted that this case corresponds to a case where performance in terms of generation of electricity at a subsequent startup could possibly be degraded due to the excessively dehydrated electrolytic membrane 11, which is caused by a dehydrated scavenging gas which is continued to supply to the anode passage 12*a* and the cathode passage 13*a* while the temperature of the fuel cell 10 is high.

When the controller 71 determines that the temperature of the fuel cell 10 is not higher than the predetermined temperature (S105 No), flow proceeds to step S116. It should be noted that this case corresponds to a case where performance in terms of generation of electricity at a subsequent startup could not possibly be degraded. The reason for this is that because the temperature of the fuel cell 10 is low, the electrolytic membrane 11 is not excessively dehydrated even if a dry scavenging gas without humidification is continued to supply to the anode passage 12*a* and the cathode passage 13*a*.

In step S106, the controller 71 determines an instruction for an amount of scavenging gas bypassing the humidifier 33 based on the temperature of the fuel cell 10 detected by the temperature sensor 25 and a map for prevention of dehydration which is stored in the control data memory 72 (see FIG. 2). The controller 71 controls opening of the humidifier valve 33c in accordance with the instruction. A part of the scavenging gas flows through the line 33b so as to bypass the humidifier 33 and the other part is humidified by the humidifier 33. In downstream of the humidifier 33, these parts of the scavenging gas are mixed to be a scavenging gas, which has a proper amount of moisture with respect to the temperature of the fuel cell 10. This scavenging gas is supplied to the anode passage 12a and the cathode passage 13a. As a result, it is possible to prevent the electrolytic membrane 11 from being excessively hydrated, which provides the fuel cell 10 with a good condition suitable for generation of electricity at a subsequent startup.

In step S107, the controller 71 determines whether or not scavenging has been finished. Using an internal clock, the controller 71 determines whether or not a predetermined time stored in the control data memory 72 has elapsed after starting of scavenging in step S104.

When the controller 71 determines that the predetermined time has elapsed and scavenging has been finished (S107 Yes), flow proceeds to step S108. In contrast, if the controller 71 determines otherwise (S107 No), flow returns to step S106, where the controller 71 controls the humidifier valve 33c.

In step S108, the controller 71 controls VCU 52 so as to shut off generation of electricity by the fuel cell 10.

In step S109, the controller 71 controls to stop the compressor 31, to close the purge valve 24, the humidifier valve 33c and the scavenging valve 41, to open the intercooler valve 32c and to shut off the fuel cell system 1.

In step S110, the controller 71 incorporates a temperature detected by the temperature sensor 25 as a system temperature. In step S111, the controller 71 determines whether or not this system temperature is lower than the freezing point (0 degrees Celsius).

If the controller 71 determines that the system temperature is lower than the freezing point (system temperature <0 degrees Celsius) (S111 Yes), flow proceeds to step S113. After the controller 71 sets FlagA (FlagA←1) corresponding to a low-temperature startup so that the fuel cell 10 is started up in a low-temperature startup at a subsequent startup, flow proceeds to the step S112. This enables the controller 71 to apply a low-temperature startup to the fuel cell system 1 even if the system temperature is not lower than the freezing point when IG 62 is turned on at the subsequent startup, as long as the fuel cell system 1 has experienced a temperature lower than the freezing point during the previous shutoff. The reason why this is possible is that FlagA retains presence of an experienced temperature condition below the freezing point.

In contrast, the controller 71 determines that the system temperature is not lower than the freezing point (system temperature ≧0 degrees Celsius), flow proceeds to step S112. In this case, the controller 71 does not set FlagA, keeping its current status (Flag A=0).

In step S112, the controller 71 determines whether or not IG 62 has been turned on according to a signal sent by IG 62. When the controller 71 determines that IG 62 has been turned on (S112 Yes), flow proceeds to END, where the controller 71 finishes a control flow for shutoff. The controller 71 then starts a control flow for startup shown in FIG. 4. In contrast, when the controller 71 determines otherwise (S112 No), flow returns to step S110.

Description is next given of a case where flow proceeds to step S114. In this case, the fuel cell system 1 has not experienced a low-temperature startup at its startup preceding a current shutoff operation (S103 No).

In step S114, the controller 71 controls scavenging for the anode passage 12a and the cathode passage 13a similarly with step S104.

In step S115, the controller 71 determines similarly with step S107 whether or not scavenging has been finished based on whether or not the predetermined time has elapsed after scavenging conducted in step S114. When the controller 71 determines that scavenging has been finished (S115 Yes), flow proceeds to step S108. When the controller 71 determines otherwise (S115 No), step S115 is repeated.

Description is given of a case where although the fuel cell system 1 has experienced a low-temperature startup at its startup preceding the current shutoff operation (S103 Yes), flow proceeds to step S116 because the temperature of the fuel cell 10 is not higher than the predetermined temperature (S105 No).

In step S116, the controller 71 opens the humidifier valve 33c. Accordingly, a scavenging gas coming from the compressor 33 bypasses the humidifier 33 (an amount of bypassed gas 100%, see FIG. 2). A dry scavenging gas without humidification is supplied to the anode passage 12a and the cathode passage 13a so as to scavenge them.

When the fuel cell system 1 has been started up in a low-temperature startup (S103 Yes) and the temperature of the fuel cell 10 is not higher than the predetermined temperature (S105 No), it is understood that the fuel cell system 1 has experienced the following conditions. Although the fuel cell system 1 has been started up in a low-temperature startup (FIG. 4, S201 Yes), IG 62 has been turned off in a short period of time before the fuel cell system 1 and the fuel cell 10 are properly warmed up. Because the temperature of the fuel cell 10 is lower than the predetermined temperature, water condensed during the shutoff remains in the MEA (electrolytic membrane 11).

In this case, it is possible to supply a large amount of dry scavenging gas, which is made to bypass the humidifier 33, which causes a pressure drop, to the anode passage 12a and the cathode passage 13a. Because the condensed water in the MEA (electrolytic membrane 11) tends to efficiently evaporate to mix with the scavenging gas, it is possible to rapidly scavenge the passages. This prevents the fuel cell 10 from freezing.

In step S117, the controller 71 determines similarly with step S107 whether or not scavenging has been finished based on whether or not the predetermined time has elapsed after scavenging conducted in step S104. When the controller 71 determines that scavenging has been finished (S117 Yes), flow proceeds to step S108. When the controller 71 determines otherwise (S117 No), step S117 is repeated.

b. Startup of Fuel Cell System

Description is given of operation of the fuel cell system 1 at startup with reference to FIG. 4 and the like.

When IG 62 is turned on, flow for startup shown in FIG. 4 starts. It should be noted that upon IG 62 turned on, the controller 71 receiving an ON signal opens the shut-off valve 22 of the anode system 20 so as to supply hydrogen to the anode passage 12a of the fuel cell 10.

In step S201, the controller 71 determines whether or not the fuel cell system 1 is started up in a low-temperature startup based on FlagA. When FlagA is equal to 1, which indicates the fuel cell system 1 has experienced a temperature below the freezing point during shutoff, it is estimated that there is at least a frozen part in the fuel cell system 1. In this case, the controller 71 selects a low-temperature startup (S201 Yes), flow proceeds to step S202. When the controller 71 selects otherwise (S201 No), flow proceeds to step S203.

In step S202, the controller 71 starts up the fuel cell system 1 in a low-temperature operation mode. More specifically speaking, the controller 71 controls the compressor 31 so as to supply air (reactive gas for low temperature) to the fuel cell 10 in flow rate and pressure higher than a normal operation mode. Accordingly, the fuel cell 10 operates in the low-temperature operation mode, in which generation of electricity is higher than the normal operation mode. Because heat dissipated by the fuel cell 10 is greater than that of the normal operation mode, defrosting starts soon in the fuel cell 10, spreading into the whole fuel cell system 1.

The controller 71 starts up the fuel cell system 1 in the low-temperature operation mode so as to defrost and warm up the fuel cell 10 and the fuel cell system 1.

In step S203, the controller 71 controls the compressor 31 in a normal operation mode so as to supply air (reactive gas for normal operation) in normal flow rate and pressure. In this way, the fuel cell 10 generates electricity normally. Flow proceeds to END and the controller 71 finishes control of the fuel cell system 1 at startup.

Figure 5A:
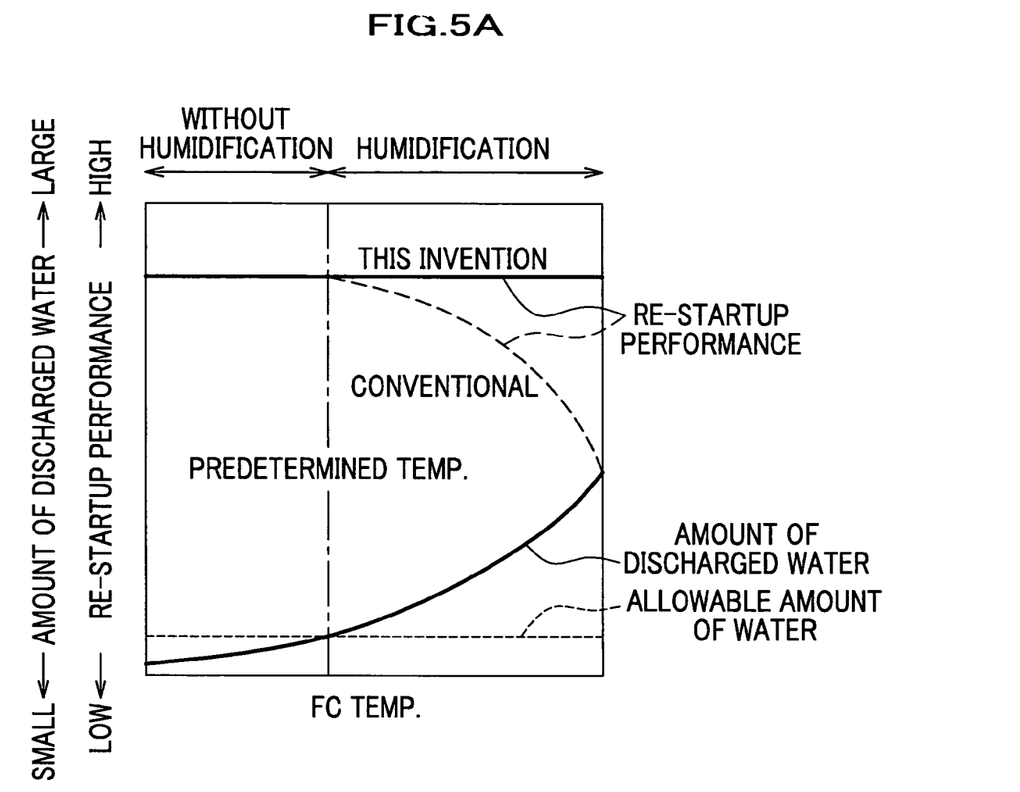
FIG. 5A is a graph showing a relationship between a temperature of a fuel cell, an amount of discharged water and a restarting performance.
Figure 5B:
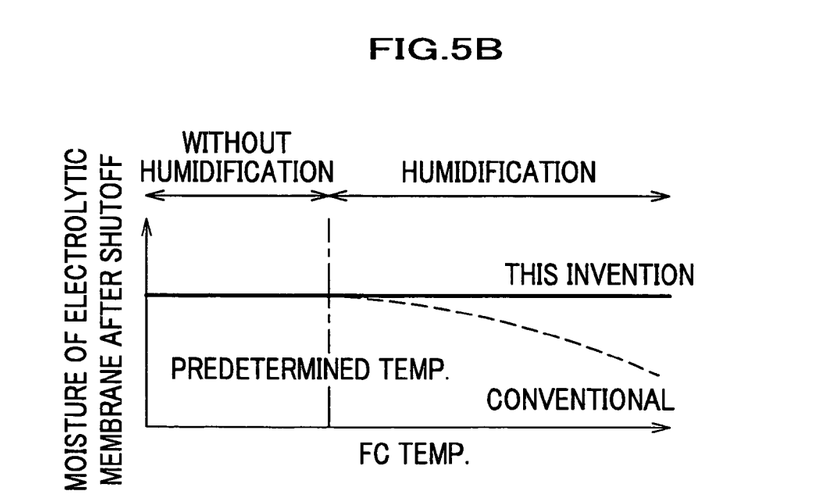
FIG. 5B is a graph showing an amount of water contained in an electrolytic membrane after shutoff.
Figure 6:
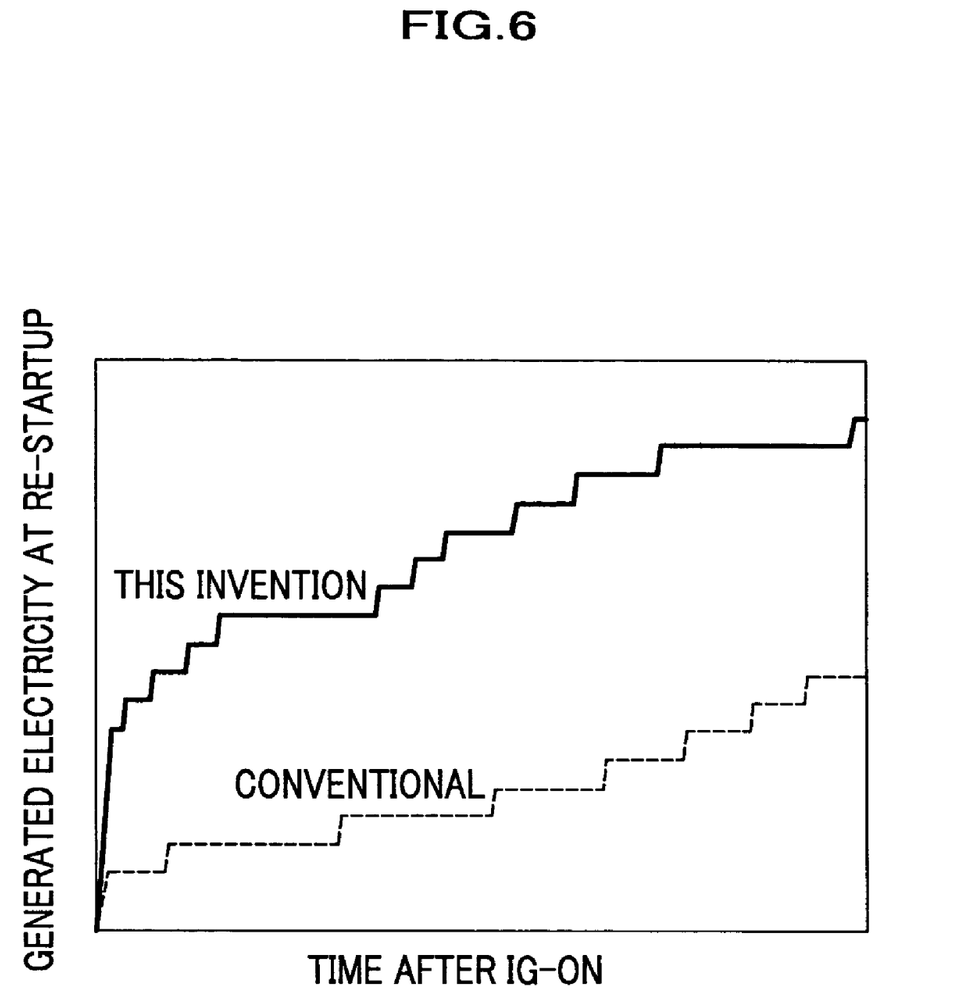
FIG. 6 is a graph illustrating performance of the fuel cell system according to the present invention compared with a conventional system.

Description is next given of advantages obtained by the fuel cell system 1 with reference to FIGS. 5 and 6.

As shown in FIG. 5A, an amount of water discharged from the fuel cell 10 by scavenging after IG 62 is turned off is the same for both this embodiment and a conventional system. However, this embodiment offers an advantage that it is possible to keep the electrolytic membrane 11 properly moistened, as shown in FIG. 5B, different from the conventional system in which an electrolytic membrane is excessively dehydrated. The reason for this is that the scavenging gas is humidified when the temperature of the fuel cell 10 is higher than the predetermined temperature.

Accordingly as shown in FIG. 6, output (generated electricity) of the fuel cell 10 of this embodiment at a subsequent re-startup of the fuel cell system 1 is higher than the conventional system. Because the scavenging gas is humidified according to the temperature of the fuel cell 10 when scavenging is conducted at a shutoff of electricity generation, as shown in FIG. 5B, it is possible to stabilize performance in terms of restarting of the fuel cell 10, preventing a decrease in the performance as observed in the conventional system.

The present invention is not limited to the preferable embodiment of the present invention described above, but various changes and modifications can be made without departing from the spirit and scope, for example, as shown below.

Figure 7:
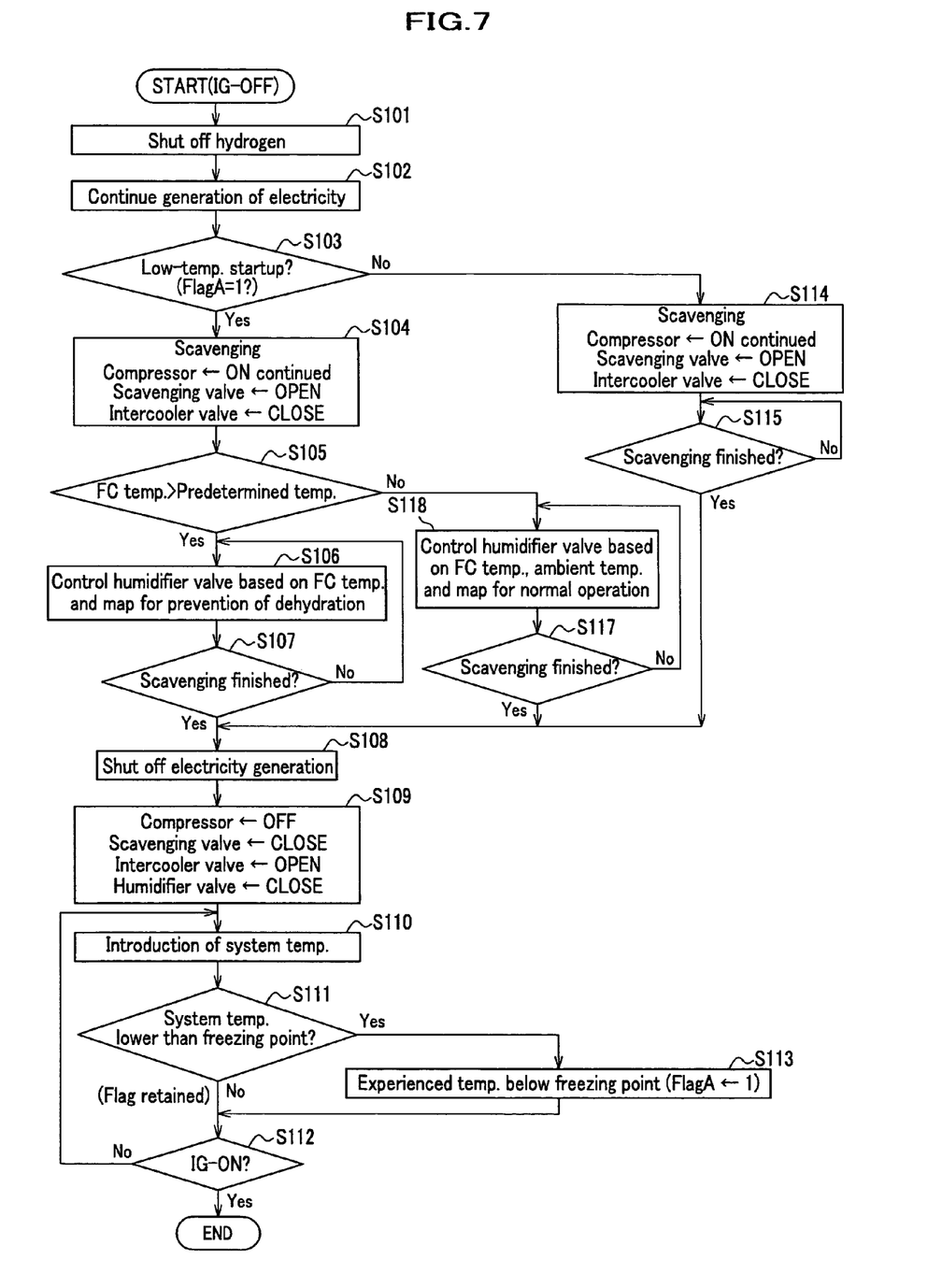
FIG. 7 is a flow chart showing steps for shutting off a modified fuel cell system according to the present invention.
Figure 8:
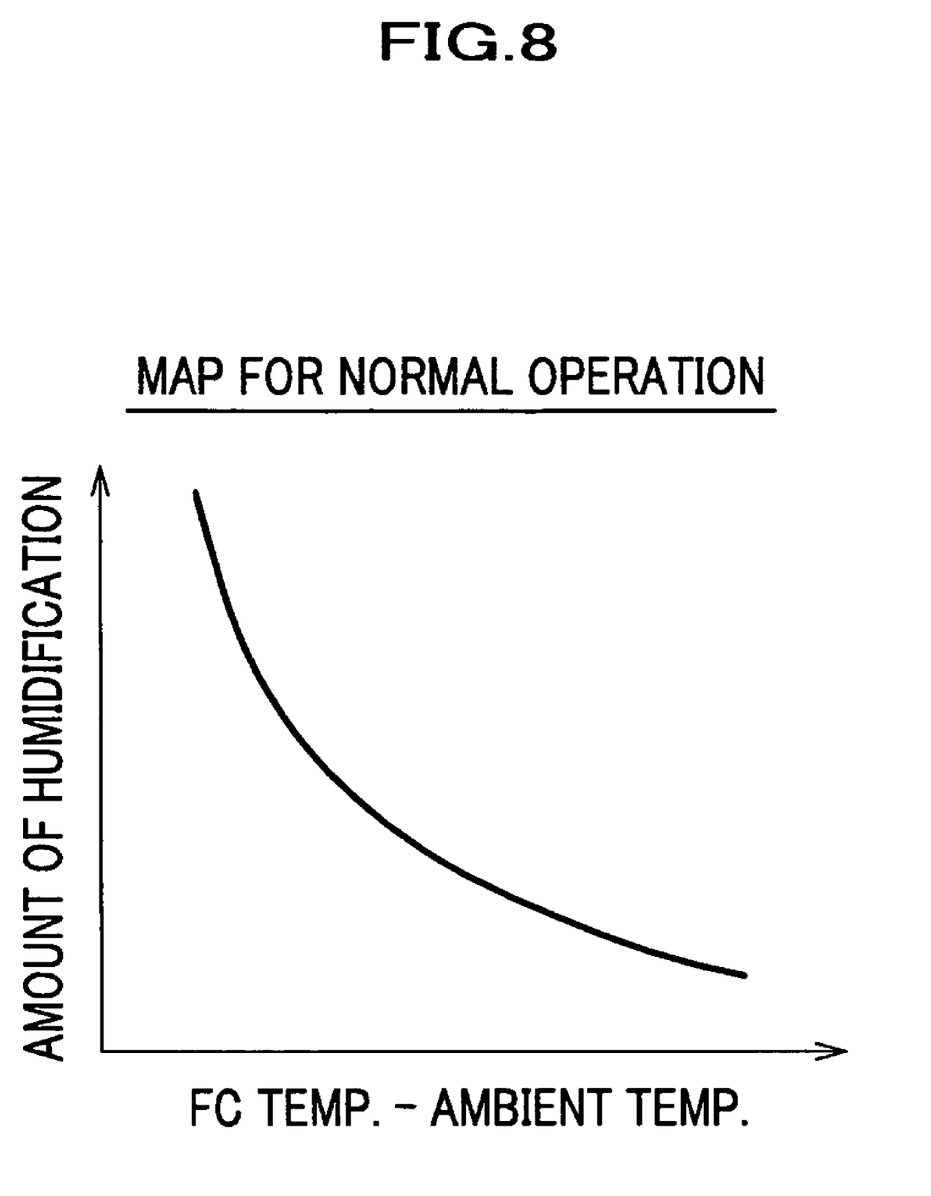
FIG. 8 is a map for normal operation for the modified fuel cell system according to the present invention.

As shown in FIG. 3, it is arranged in the embodiment described above that the humidifier valve 33c is opened so as not to humidify the scavenging gas during control of the fuel cell system 1 at shutoff if the following conditions are satisfied. Namely, the fuel cell system 1 has been started in a low-temperature startup at the previous startup (S103 Yes) and the temperature of the fuel cell 10 is not higher than the predetermined temperature at scavenging (S105 No). Alternatively as shown in step S118 of FIG. 7, it may be possible to control an amount of humidification or an amount of bypassing (opening of the humidifier valve 33c) based on a difference between a temperature of the fuel cell 10 and an ambient temperature detected by the ambient temperature sensor 61 and a map for normal operation. The map for normal operation is empirically obtained in advance and stored in the control data memory 72 (see FIG. 8). As shown in FIG. 8, the map for normal operation has a relationship that the greater is the difference between the temperature of the fuel cell 10 and the ambient temperature, the less is the amount of humidification. When the difference is great, the controller 71 decreases the amount of humidification in accordance with the map for normal operation. In this way, it is possible not only to prevent the anode passage 12a and the cathode passage 13a from being blocked due to much condensed water adhering to walls of these passages, but also to keep the electrolytic membrane 11 properly moistened. When the fuel cell system 1 is restarted subsequently, it is possible to allow the fuel cell 10 to generate electricity properly and to increase its output electricity, accordingly.

In the embodiment described above, the temperature sensor 25 detecting the temperature of anode exhaust gas, which is disposed in the line 24a in downstream of the fuel cell 10, as means for detecting the temperature of the fuel cell 10. The present invention is not limited to this sensor, but it may be alternatively possible to adopt various types of sensors, a temperature sensor attached to a chassis of the fuel cell 10, a temperature sensor attached to the line 34a of the cathode system 30 for detecting a temperature of the cathode exhaust gas or a temperature sensor for detecting a temperature of a cooling fluid which cools the fuel cell 10, for example. It may also be possible to adopt a combination of any of these temperature sensors, which may enable more accurate detection of the temperature of the fuel cell 10.

In the embodiment described above, an example is discussed in which a temperature detected by the temperature sensor 25 is regarded as a common temperature for the fuel cell 10 and the fuel cell system 1. It goes without saying that it may be alternatively possible to provide individual temperature sensors for them.

In the embodiment described above, it is arranged that the scavenging gas bypasses the humidifier 33 when the humidifier valve 33c is opened, which is disposed in the line 33b bypassing the humidifier 33. It may be alternatively possible to adopt an arrangement that the scavenging gas bypasses the humidifier 33 when the humidifier valve 33c is closed, which is disposed in immediate downstream of the humidifier 33.

With respect to the intercooler 32, it may also be alternatively possible to adopt an arrangement that air supplied by the compressor 31 bypasses the intercooler 32 when the intercooler valve 32c is opened, which is disposed in the line 32b.

In the embodiment described above, it is exemplarily discussed that IG 62 corresponds to the instructing unit and an OFF signal of IG 62 corresponds to the instruction for a shutoff of electricity generation, but the present invention is not limited to this. For example, it may be alternatively possible to adopt means for determining idle stop, which generates an instruction for idle stop (instruction for a shutoff of electricity generation), in place of the instructing unit.

In the embodiment described above, the low-temperature operation mode for increasing self heat dissipation by the fuel cell 10 is defined as one in which the fuel cell 10 is controlled so as to generate higher electricity. This is implemented by operating the compressor 31 at a higher rotational speed than usual so that air having flow rate and pressure higher than the normal operation (reactive gas for a low temperature) is supplied to the fuel cell 10. However, the present invention is not limited to this example.

It may be alternatively possible to control a pressure reducing valve (not shown) between the shut-off valve 22 and the ejector 23 of the anode system 20 so as to increase a secondary (downstream) pressure so that highly pressurized hydrogen is supplied to the anode 12 of the fuel cell 10. It may also be alternatively possible to decrease a time interval to open the purge valve 24 of the anode system 20 so that concentration of hydrogen gas supplied to the anode 12 becomes higher. It may further be alternatively possible to control a back pressure valve (not shown) disposed in the line 34a in downstream of the fuel cell 10 so that highly pressurized air is supplied to the cathode 13 of the fuel cell 10. It may still further be alternatively possible to increase a threshold for protection of cell voltage, which is intended to protect a unit cell of the fuel cell 10 (stack). It may be possible to adopt a combination of any of the approaches described above.

Although the fuel cell system 1 mounted on an automobile has been exemplarily described in the embodiment described above, the present invention is not limited to this example. For example, it may be alternatively possible that a fuel cell system is a fixed type used at home.

In the embodiment described above, it is determined in step S105 of FIG. 3 whether or not the scavenging gas is humidified when scavenging is conducted at shutoff based on whether or not the temperature of the fuel cell 10 is higher than the predetermined temperature. It may be alternatively possible to compare an ON time of IG 62, which is an elapsed time between a previous startup and turning off of IG 62, with a predetermined time. In this case, when the ON time is longer than the predetermined time, the scavenging gas is humidified in step S106 based on estimation that the temperature of the fuel cell 10 is higher than the predetermined temperature. When the ON time is not longer than the predetermined time, the humidifier valve 33c is opened so as not to humidify the scavenging gas in step S116 based on estimation that the temperature of the fuel cell 10 is not higher than the predetermined temperature.

In other words, it may be alternatively possible to determine whether or not humidification is conducted based on comparison between the ON time and the predetermined time instead of comparison between the temperature of the fuel cell 10 and the predetermined temperature. In this case, means for counting time, a timer for example, which counts an ON time from a previous startup to turning off of IG 62 may corresponds to temperature detecting means. It goes without saying that this case lies within the spirit and scope of the present invention.

Foreign priority document, JP2005-302241 filed on Oct. 17, 2005 is hereby incorporated by reference.

What is claimed is:

1. A method for shutting off a fuel cell system, the system including a fuel cell having a reactive gas passage, the fuel cell generating electricity with a reactive gas supplied to the reactive gas passage, the method comprising:
   determining an actual temperature of the fuel cell;
   selecting one of a normal operation mode and a low temperature operation mode to expedite starting of the fuel cell, based on the actual temperature of the fuel cell;
   determining whether or not the fuel cell has been started in the low temperature operation mode;
   providing an instruction for a shutoff of electricity generation of the fuel cell;
   supplying a scavenging gas for the reactive gas passage; and
   comparing the actual temperature of the fuel cell with a predetermined temperature,
   wherein when the actual temperature of the fuel cell is higher than the predetermined temperature, the scavenging gas is humidified according to the actual temperature of the fuel cell, and
   wherein when the actual temperature of the fuel cell is not higher than a predetermined temperature, the scavenging gas is not humidified.

2. The method of claim 1, wherein said reactive gas passage of said fuel cell system includes an anode passage.

3. The method of claim 1,
   wherein the fuel cell continues to generate electricity until a predetermined duration time elapses after the step of supplying the scavenging gas starts, if it is determined that the fuel cell has been started in the low temperature operation mode, and
   wherein the predetermined duration time corresponds to a time from when the step of supplying the scavenging gas starts to when the step of supplying the scavenging gas is completed.

4. The method of claim 3, wherein said reactive gas passage of said fuel cell system includes an anode passage.

* * * * *